US012786431B2

(12) United States Patent
Dai

(10) Patent No.: US 12,786,431 B2
(45) Date of Patent: Nov. 3, 2026

(54) SYSTEMS AND METHODS FOR VIDEO CODING ON REGIONS OF INTEREST

(71) Applicant: Agora Lab, Inc., Santa Clara, CA (US)

(72) Inventor: Wei Dai, Shanghai (CN)

(73) Assignee: Agora Lab, Inc.

( * ) Notice: Subject to any disclaimer, the term of this patent is extended or adjusted under 35 U.S.C. 154(b) by 0 days.

(21) Appl. No.: 18/984,796

(22) Filed: Dec. 17, 2024

(65) Prior Publication Data

US 2026/0172575 A1 Jun. 18, 2026

(51) Int. Cl.
*H04N 19/167* (2014.01)
*H04N 19/124* (2014.01)
*H04N 19/137* (2014.01)
*H04N 19/176* (2014.01)

(52) U.S. Cl.
CPC ......... *H04N 19/167* (2014.11); *H04N 19/137* (2014.11); *H04N 19/176* (2014.11)

(58) Field of Classification Search
CPC ... H04N 19/167; H04N 19/137; H04N 19/176
USPC .................................................... 375/240.02
See application file for complete search history.

(56) References Cited

U.S. PATENT DOCUMENTS 8,279,341 B1 * 10/2012 Bozinovic ............. G06T 3/4053 348/452
8,630,353 B1 * 1/2014 Puri ....................... H04N 19/80 375/240.26
10,091,507 B2 * 10/2018 Lee ...................... H04N 19/176
2013/0195178 A1 * 8/2013 Price .................... H04N 19/115 375/E7.076
2021/0409713 A1 * 12/2021 Wu ...................... H04N 19/124
2025/0126277 A1 * 4/2025 Park ..................... H04N 19/167

* cited by examiner

*Primary Examiner* — Albert Kir
(74) *Attorney, Agent, or Firm* — IP Strategy Consulting; Daniel Maffeo

(57) ABSTRACT

Systems and methods for video coding on regions of interest are provided. In some embodiments, the methods and systems for improved ROI treatment of a coded video frame includes blocking a video frame into blocks. Next a region of interest (ROI) level to each of the blocks is assigned. This ROI assignment process may include determining variance for each block, grouping blocks by similar variance, detecting motion for each block and assigning the ROI level responsive to the variance and presence of motion for the given block. Lastly, a quantization parameter (QP) level is assigned to each block responsive to the ROI level for the given block. In some cases, the ROI level assigned to a block is responsive to a bounding box being present. The bounding box is generated responsive to an algorithm identifying an object of interest (e.g., a face).

12 Claims, 7 Drawing Sheets

SYSTEMS AND METHODS FOR VIDEO CODING ON REGIONS OF INTEREST

BACKGROUND

The present invention relates in general to the field of video compression, and more specifically to methods, computer programs and systems for video coding regions of interest (ROI) within and across video frames. Regions of interest are areas of the video frame that are considered more important from a visual standpoint, and are therefore considered "more important" to code with a higher degree of fidelity. An example of a ROI includes people's faces and other objects of importance.

Video compression standards are designed to enable reduced bandwidth and size of video content, while maintaining high levels of video quality. Current High Efficiency Video Coding (HEVC) is a video compression standard that offers significant data compression as compared against Advanced Video Coding (AVC) with comparable levels of video quality at the same or similar bit rate. HEVC uses both integer discrete cosine transform (DCT) with varied block sizes, and discrete sine transform (DST) with 4×4 block sizes. Essentially, the standard compares different parts of a frame of the video to find areas that are redundant both within a single frame and between consecutive frames. Redundant areas are then replaced with short descriptions instead of the original pixels.

In block based video coding, the system first divides the video into a multitude of blocks, which may be referred to as the largest coding unit (LCU) or macroblock (MB). Each LCU may be partitioned into smaller blocks for further prediction and reconstruction. These blocks may be assigned a degree of 'importance' based upon their content. Certain ROI may be afforded a higher importance metric as compared to a background region, for example.

Currently, ROI analysis is employed in video coding by assigning a quantization parameter (QP) to each block to control the quality and bitrate balance for the given block. Smaller QP results in better quality and larger bitrate. Larger QP has a reduced quality and lower bitrate. Generally, there is a desire for the frame to have a larger QP to reduce overall bitrates but have the specific regions of high interest have lower QP such that their quality is preserved.

Current methodologies analyze the video to determine ROI. In x264 for example, adaptive quantization calculates the variance of each block. Blocks with lower variance are presumed to be more important and are assigned lower QP. In x264, mb tree, the system analyzes the reference dependency of the blocks and gives blocks of higher reference importance a smaller QP. Generally, blocks with higher reference importance are static background. In some cases, facial detection may also be employed and a bounding box around the face region may be applied. A fixed lower QP offset will be applied to the box to improve quality for the face region.

Current systems are not without issues, however. Particularly, previous work assigns a QP offset to the ROI no matter what the base QP is. This can cause blocking artifacts in situations where the base QP is already large. Conversely, in situations where the base QP is low, it can result in wasted bitrate. Further, current works do not consider the connectedness of the various ROI regions, which can again result in unwanted artifacts. Further, current systems do not consider ROI perseverance between successive frames, again leading to roughness in the viewing experience. Lastly, no current systems impose a small QP for moving objects with high variance, which is critical for the viewing experience.

Given that there is great value in reducing artifacts in video coding, while still allowing for ROI analysis, and general improvement of viewing experience, enhanced ROI analysis and treatment is provided.

SUMMARY

The present systems and methods relate to video compression, and particularly to improved region of interest (ROI) treatment when video coding. Such systems and methods enable reduced artifacts while maintaining low bitrates in the coded video frames.

In some embodiments, the methods and systems for improved ROI treatment of a coded video frame includes blocking a video frame into blocks. Next a region of interest (ROI) level to each of the blocks is assigned. This ROI assignment process may include determining variance for each block, grouping blocks by similar variance, detecting motion for each block and assigning the ROI level responsive to the variance and presence of motion for the given block. Lastly, a quantization parameter (QP) level is assigned to each block responsive to the ROI level for the given block. In some cases, the ROI level assigned to a block is responsive to a bounding box being present. The bounding box is generated responsive to an algorithm identifying an object of interest (e.g., a face).

The ROI levels include a high ROI level, a medium ROI level and a low ROI level. The system may assign the high ROI level to a block containing motion detection and a higher variance, the high or the medium ROI level to a block containing a static background, and the low ROI level to all other blocks.

A QP level for the low ROI level is determined based upon a frame QP level, wherein the frame QP level is known. An offset for the QP level for the low ROI level and the frame QP level is inversely proportional to the frame QP level. A determination is made if the difference between a QP level for the high ROI level and a QP level for the medium ROI level is a constant, or if the difference between the QP level for the high ROI level and the QP level for the medium ROI level is equal to difference between the QP level for the medium ROI level and the QP level for the low ROI level. The QP level for the high ROI level ($QP_h$) and the QP level for the medium ROI level ($QP_m$) are calculated based upon the QP level for the low ROI level ($QP_l$) being known, the determination if the difference between the $QP_h$ and the $QP_m$ is the constant, or if the difference between $QP_h$ and the $QP_m$ is equal to difference between $QP_m$ and the $QP_l$ given the equation:

$$B_l * QP_l + B_m * QP_m + B_h * QP_h = (B_l + B_m + B_h) * QP$$

Where $B_l$ is a number of blocks with the low ROI level, $B_m$ is a number of blocks with the medium ROI level, and $B_h$ is a number of blocks with the high ROI level, and QP is the frame QP level. Lastly, the ROI level for a given block may be smoothed between consecutive frames.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
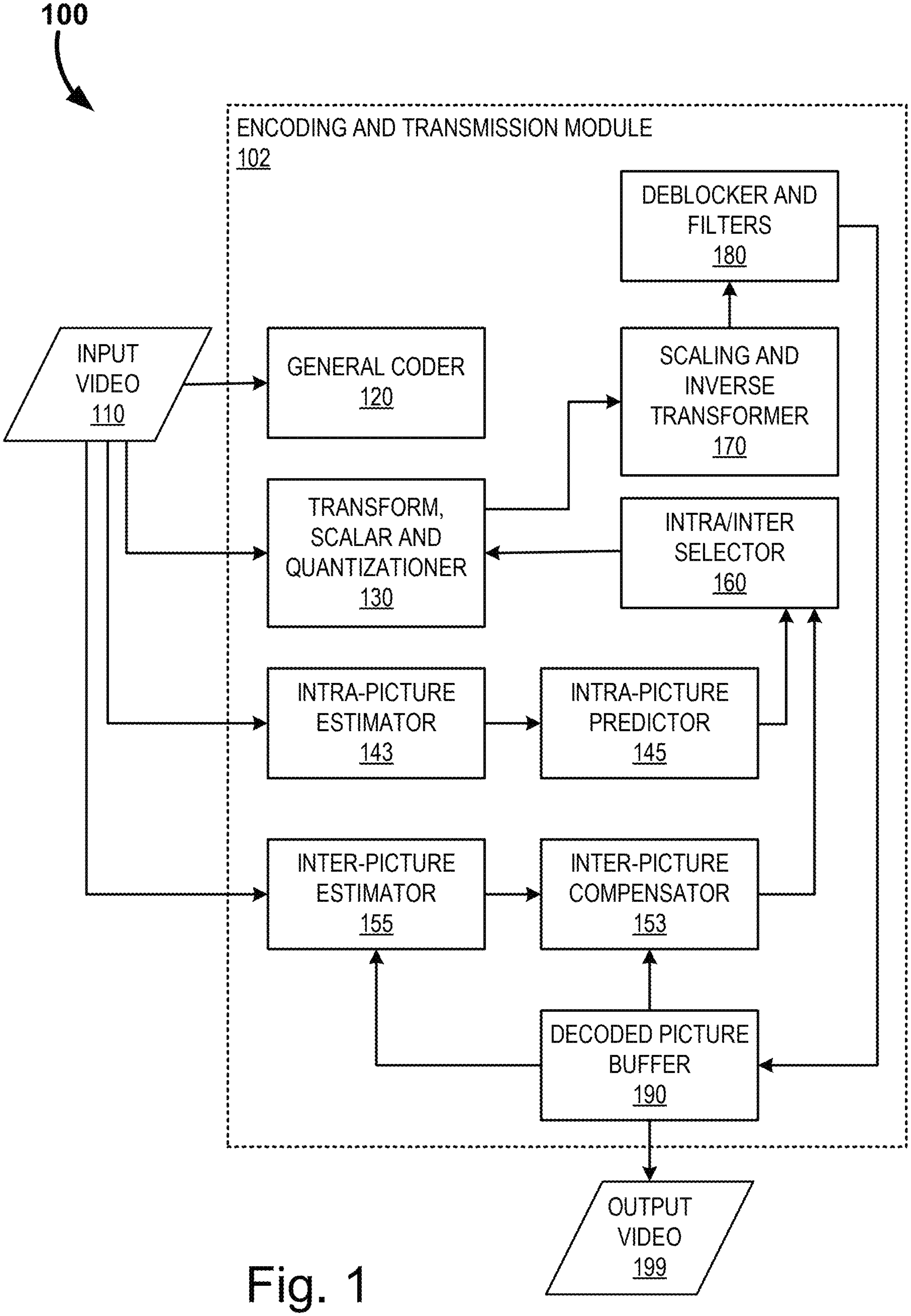
FIG. 1 is an example block diagrams of a system for encoding and transmitting video content, in accordance with some embodiment.

The present invention relates to systems and methods for enhancement of region of interest (ROI) treatment when coding video content. To facilitate discussions, FIG. 1 is an example of a system for High Efficiency Video Coding (HEVC), shown generally at 100. Coding standards are designed to achieve the highest coding efficiency possible. Coding efficiency is the ability to encode video at a minimized bitrate while achieving a quality threshold. The encoder system 102 splits an inbound picture into block shaped regions for a first picture frame, or the first frame of a random-access point using intra-picture prediction. Intra picture prediction is where prediction of blocks/pixels in the given frame is predicted by using other pixels within the same frame. After the first frame is predicted using intra-picture prediction, the other frames may be predicted using inter-picture prediction techniques. Inter-picture prediction is the prediction of block content based upon the adjacent frame data. After prediction methods are finished, the picture goes through loop filters and the final picture representation is stored in a decoded picture buffer. Images stored in the decoded picture buffer are available for use to predict yet other pictures.

In this system an input video 110 is received by a number of sub-components of the encoding and transmission module 102. These sub components include a general coder 120 and transform, scalar and quantizationer 130, intra-picture estimator 143 and an inter-picture estimator 155. The general coder 120 generates general control data, which is provided to the header formatting and context-adaptive binary arithmetic coding (CABAC) to incorporate into the coded bitstream. General control data is also provided to the transform, scalar and quantizationer 130, the intra-picture estimator 143, and the inter-picture estimator 155 (not illustrated).

Transform, scalar and quantizationer 130 performs scaling and transform functions on the input video frame and provided output as quantized transform coefficients to the header formatting and a CABAC algorithm to incorporate into the coded bitstream. Output is also provided to the scaling and inverse transformer 170. Transform units of various sizes may be used to code the prediction residuals. These transform units may be transformed using discrete cosine transforms or discrete sine transforms. The scaling and inverse transformer 170 in turn provides output to the deblocker and filtering module 180, as well as the intra-picture estimator 143 and intra-picture predictor 145.

The intra-picture estimator 143 uses a variety of prediction algorithms to estimate pixel values from neighboring pixels within the same frame. Output from the intra-picture estimator 143 is provided to an intra-picture predictor 145 which consumes the estimations and generates a prediction of the pixels of interest. Conversely, an inter-picture estimator 155 received adjacent frame data from a decoded picture buffer 190 and estimates motion between one frame to an adjacent frame. Output of the motion estimation is provided to the inter-picture compensator 153 as well as the header formatting and CABAC to incorporate into the coded bitstream (not illustrated).

The inter-picture compensator 153 generates motion compensation information. A selector 160 picks between the intra-picture predicted image data and the inter-picture motion compensated data. This information is fed back to the transform, scalar and quantizationer 130 and the deblocker and filtering module 180 (not illustrated).

The deblocker and filtering module 180 generates filtering control data, which is provided to the header formatting and CABAC to incorporate into the coded bitstream (not illustrated). Deblocked and filtered data is also provided to the decoded picture buffer 190. Output of the decoded picture buffer 190 includes the output video 199.

Figure 2:
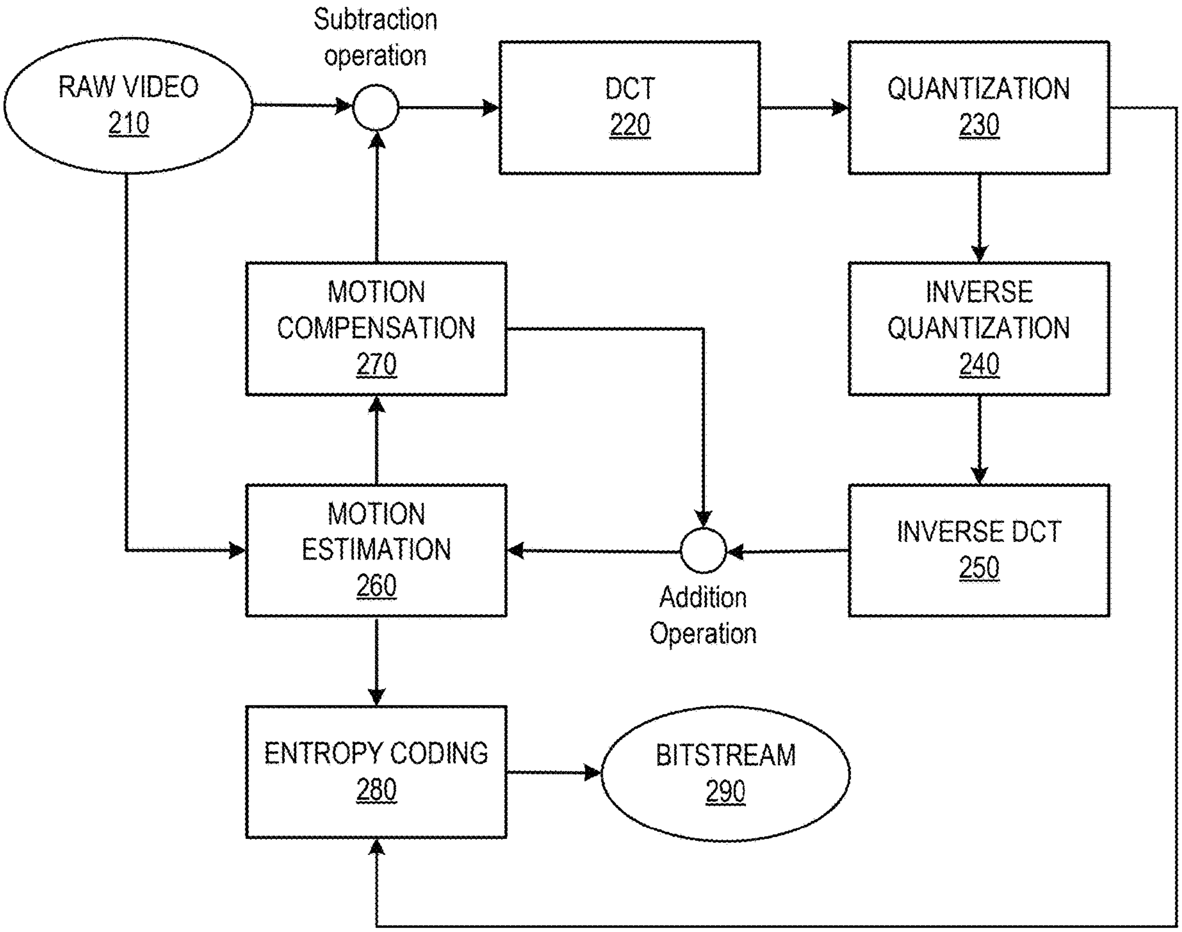
FIG. 2 is an example block diagram for the logical stages taken when coding video, in accordance with some embodiments.

Turning to FIG. 2, a block diagram is provided for the logical frow and transformation of data for the generation of a bitstream 290 from a raw video 210. Initially, the raw video 210 is subjected to a subtraction operation. Subtraction includes dividing the frame into blocks in one or more sizes. In some embodiments, the blocks range in size from 4×4 to 64×64 pixels. Next a two-dimensional discrete cosine transform (DCT) 220 is applied to each block. DCT significantly reduces the amount of memory and bandwidth of the compressed video. DCT 220 is applied to each residual values, including from intra-coding and inter-coding.

After DCT 220 the output is provided to quantization module 230. The quantization scale code is divided elementwise by a quantization matrix and rounds each resultant element. A quantization parameter (QP) determines the step size for associating the transformed coefficients with a finite set of steps. The residuals are next reconstructed by inverse quantization 240 and inverse DCT 250 respectively. The resulting residual blocks may be reassembled in an addition function with the motion compensation results from 270.

Motion estimation 260 utilizes the de-blocked output, as well as the raw video 210 in order to encode one frame in terms of another. Motion estimation 260 encodes the frame data by modified forms of another adjacent frame(s). The goal of motion estimation is to find the best match between regions in the two adjacent frames. The input of motion estimation is macroblocks and search areas. The motion estimation 260 performs block motion estimation which computes motion vectors (MVs) using search algorithms. The most basic search method is using the full search algorithm which processes all pixels in the search range to find the best block matching via a cost function. The output of the motion estimation is provided to motion compensator 270 with in turn is used in the blocking process. Additionally, output from the motion estimation, as well as output from the quantization step, is provided to an entropy coder 280.

The entropy coder 280 is a lossless data compression scheme. It creates and assigns a unique prefix code to each unique symbol in the input. Entropy coding is executed on the quantization results from each macroblock to generate the bitstream 290.

Bitstream is dependent upon the quantization parameter (QP) of the frame. A lower QP results in higher quality coding and larger bitstream, whereas a larger QP results in lower quality coding and a lower bitstream. Thus a balance is made between acceptable quality and low bitstream. One way to maximize this process is assigning different QP levels to different blocks with the goal of getting an average QP that is acceptably low (thus ensuring a reasonable bitrate at an acceptable image quality), yet with particular blocks of interest that the viewer notices most having a lower QP and therefore a higher viewing quality.

As noted, current region of interest (ROI) treatment is quite lacking. There is generally an assigned QP offset that does not vary based upon the base QP for the entire frame. This results in either artifacts or wasted bitrate based upon the base QP level. There isn't concern over connectedness of the ROI regions, again introducing artifacts into the process. Smoothness across frames isn't maintained, and ROI detection methods are sub-optimal.

Figure 3:
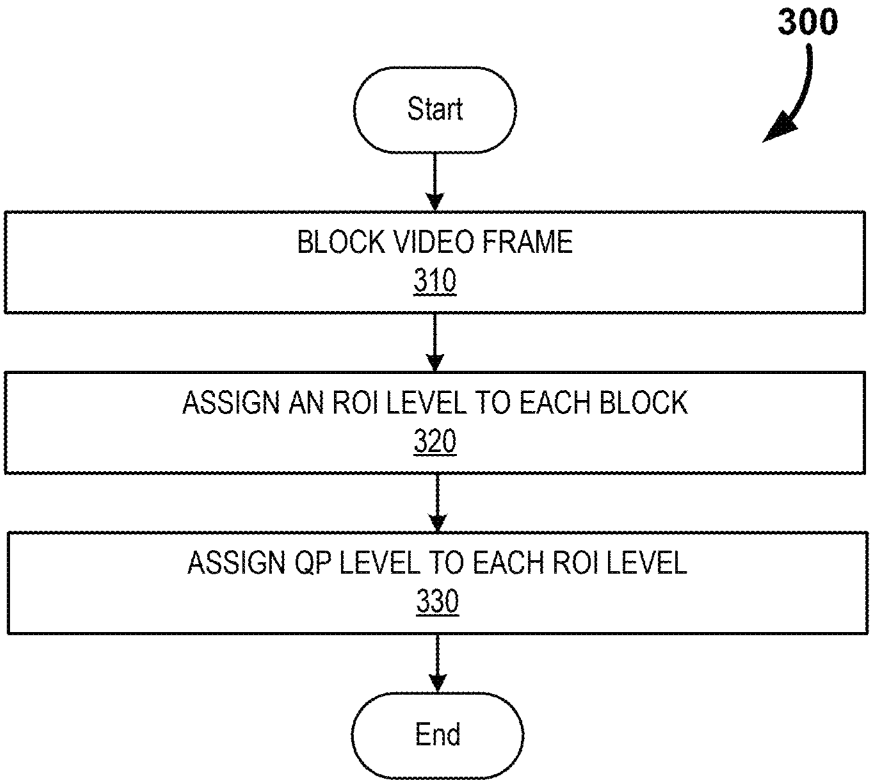
FIG. 3 is a flow diagram for an example process of region of interest (ROI) analysis when coding a video, in accordance with some embodiments.

In order to address these shortfalls, an improved ROI treatment methodology is employed. FIG. 3 provides a high level diagram for the process of ROI analysis and treatment, shown generally at 300. This process addresses all the failings of current ROI analysis, thereby reducing artifacts, optimizing bitrates, and generally improving the viewing experience for the encoded video.

The process starts as any video coding process starts, with the blocking of the video frame, at 310. Next an ROI level is assigned to each block, at 320. In some embodiments, the ROI designation may be between a "high" ROI level and a "low" ROI level. In other embodiments, there may be a "high" ROI level, a "medium" ROI level and a "low" ROI level. In yet other embodiments, there may be even more granular ROI leveling. However, for the bulk of the enclosed discussion, the disclosure will focus on a high ROI, a medium ROI and a low ROI level. Three levels generally meet the needs of video coding and producing an image with minimal artifacts. Having three ROI levels is computationally manageable, and provides clarity in the explanation and brevity to the disclosure. However, it should be understood that more or fewer ROI levels are contemplated, and the focus on three ROI levels is not intended to artificially limit the scope of this disclosure.

Additionally, the terms "high", "medium" and "low" are intended to provide a relative position of the levels against one another; with "high" being the region of mot interest, "low" the region of least interest, and "medium" a region of interest intermediate to the "high" and "low" levels.

Figure 4:
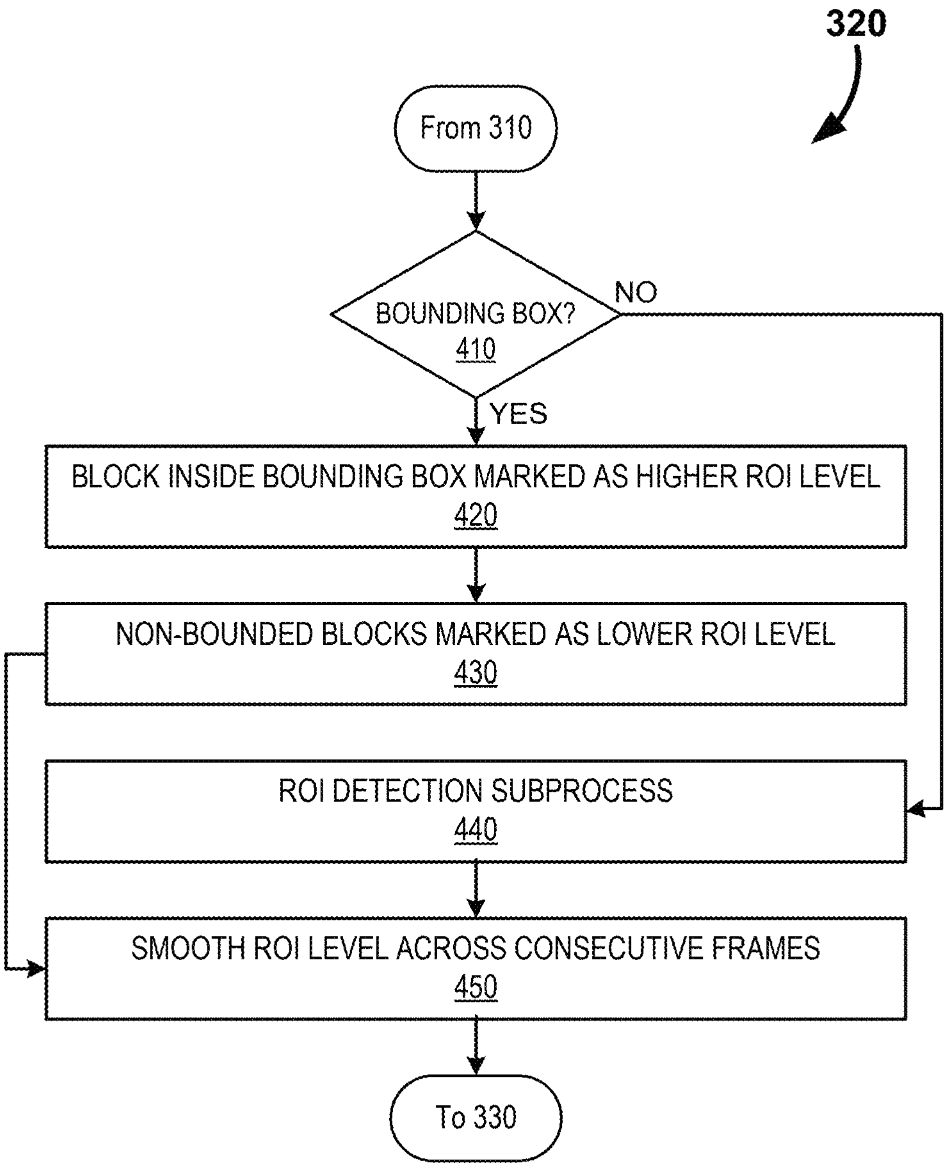
FIG. 4 is a flow diagram for an example sub-process of assigning a region of interest level, in accordance with some embodiments.

FIG. 4 provides a more detailed discussion of the process of assigning an ROI level to each block. Initially, the frame may be preprocessed by a neural network or other algorithm for identification of particular ROIs (not illustrated). For example, a facial recognition model may be employed to identify faces in the frame. Other neural networks or other machine learning (ML) models may identify other objects of interest in a similar way. For example, animals may be identified by these programs. Likewise, weapons in an action movie may likewise be identified and flagged. In general, any visual element that draws the attention of the user may be identified by the neural network and thus flagged. One method of training such neural networks is to play video clips, or entire movie works, to individuals and perform eye movement tracking to determine what the user looks at. This may be fed directly to the modeling algorithm to develop the trained model. Other models may be more discrete, such as a facial recognition model. The results of these models may be output as a bounding box around a visual element of interest. This bounding box may encompass one or more blocks that were previously generated.

The proposed methods initially determines if such a bounding box (regardless of the underlying algorithm utilized to generate the bounding box) is present, at 410. If such a bounding box is present, then the blocks inside the bounding box are marked as a "high" ROI level, at 420. Non bounded blocks are marked as a lower ROI level, at 430. When only two ROI levels are present, the non-bounded blocks are assigned a "low" ROI level. When multiple levels of lower ROI levels are utilized, the system may use ROI detection methods on the un-bounded blocks to differentiate the specific ROI levels for these remaining blocks. ROI detection methods will be described in greater detail below. Conversely, the system may assign intermediate ROI levels to blocks bordering the "high" ROI level bounded blocks, and yet lower ROI levels to blocks further from the high ROI level blocks. This kind of a gradient of ROI levels, stretching from the bounded blocks, may help in reducing artifacts.

Figure 5:
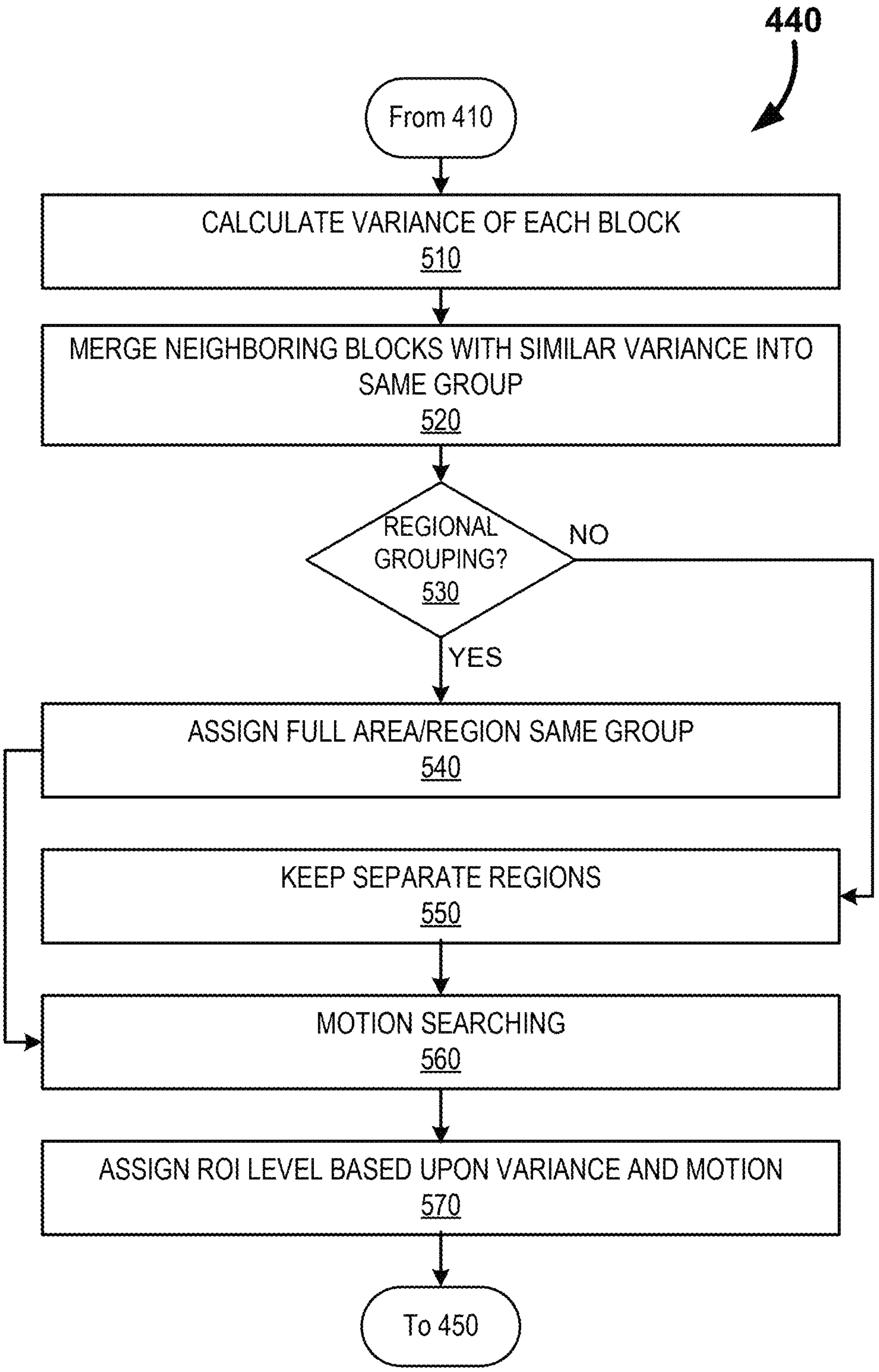
FIG. 5 is a flow diagram for an example sub-process of ROI detection, in accordance with some embodiments.

If however, earlier there is no bounding box present (or when intermediate ROI levels are desired to be assigned to unbounded blocks), an ROI detection subprocess may be employed, at 440. FIG. 5 provides a more detailed description of this ROI detection process. It involves the calculation of the variance of each block, at 510. The variance is the expected value of the squared deviation from the mean of a random variable.

Blocks with similar variance, which neighbor each other are merged into a single group, at 520. "Similar variance" may mean having identical variance, or variance within a predefined threshold of each other. For example having a variance within 10% of one another.

A determination if regional grouping is also desired is also performed, at 530. In some embodiments, regional grouping may be employed when above a predefined threshold of the blocks in a region are of a similar variance level. Alternatively, regional grouping may be unfavorable when the degree of variance difference between blocks in the given area are above a given threshold.

When it is determined to do such regional grouping, the full region is assigned to the same group, at 540. Conversely, if regional grouping is not desired, the region may be kept as separate groupings, at 550. Regardless of if a region is assigned all to one group versus kept as separate groups, the process next performs motion detection between the frames, at 560. Motion detection is dependent upon analysis of the calculated motion vectors.

Lastly, the system will assign an ROI level based upon the variance level and motion presence, at 570. In particular, if the variance of a block/group is high, and there is motion detection above a given threshold detected, the block/group may be assigned a "high" ROI level. If there is no motion detected and the block/region is a static background, the blocks/region may be assigned a "high" or intermediate "medium" ROI level. Otherwise, the blocks/regions may be assigned a "low" ROI level.

Returning to FIG. 4, once the ROI levels for the given frame are determined (either through bounding or ROI detection methods), the ROI level for the block may undergo a smoothing process between frames, at 450. For example, if a block in one frame is rated "high" then "low" in a subsequent frame, the "low" ROI may be shifted to "medium" to avoid a sudden shift in ROI level. Likewise, if a block is "high" ROI for multiple consecutive frames, but "low" in a random frame, the system may determine that the "low" ROI designation was in error, and may reassign the block a "high" ROI for the one odd frame. Similarly, "low" ROI blocks may be smoothed between consecutive frames.

Figure 6:
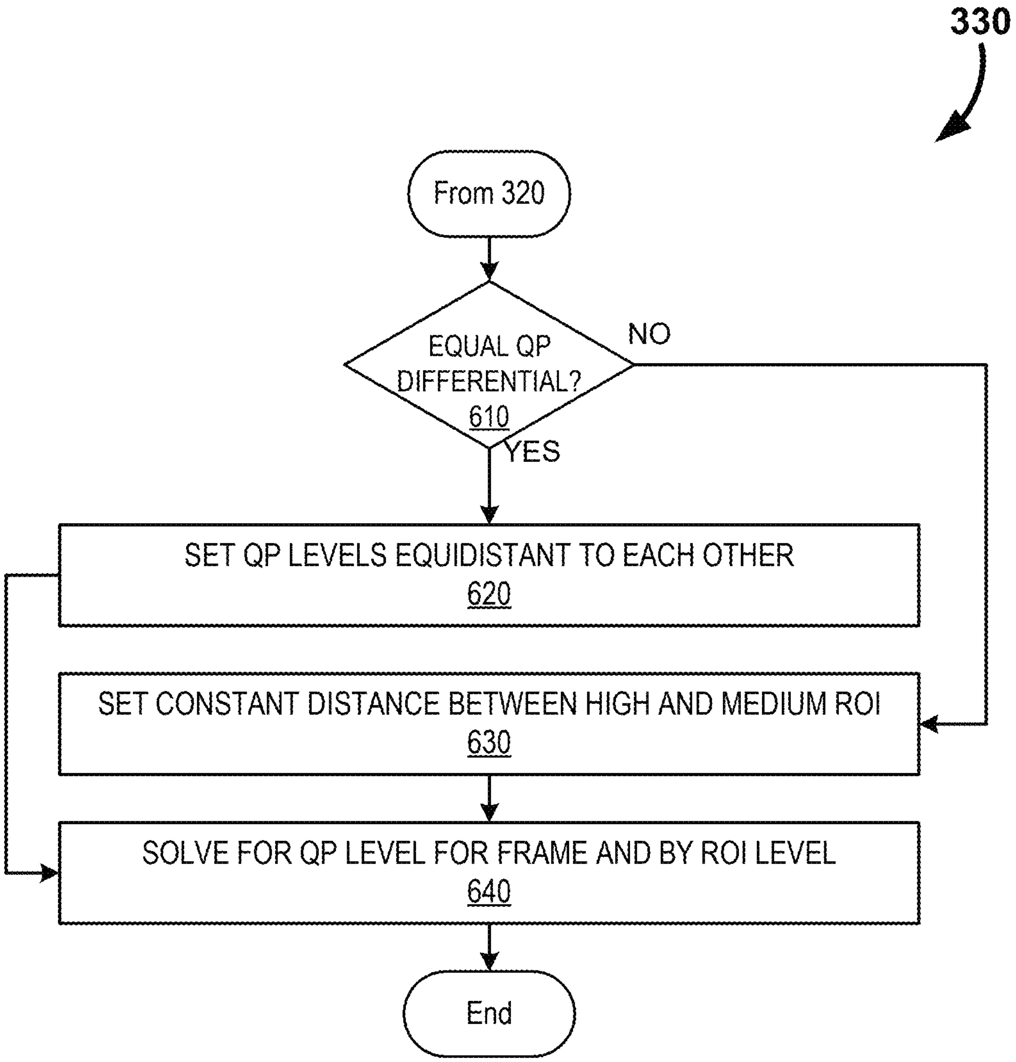
FIG. 6 is a flow diagram for an example sub-process of assigning a quantization parameter (QP) level to the various ROI levels, in accordance with some embodiments.

Returning to FIG. 3, once the ROI levels have been set for the frame, the system may assign the quantization parameter (QP) levels to each ROI level, at 330. FIG. 6 provides a more detailed description of this sub process. The first step of this process is to determine if an equal QP differential is to be used or not, at 610. This process involves defining the maximum QP value of the "low" ROI level for a given bae frame QP. For example, if the QP for the frame is 20 (relatively low base QP level), the system may set the maximum "low" ROI level QP to be 30. However, if the base QP level for the frame is 40 (relatively large base QP level) the low ROI level's QP may be set to 41. The reason for this is that for QP's above approximately 38, there is a large likelihood of blocking artifacts being present. Thus, there is smaller overhead for a QP increase. Generalizing this, the base QP is inversely proportional to the difference in QP between the base QP and the "low" ROI level QP. In some cases this inverse proportionality is exponential. In other cases, it may be linear. In some particular cases, the QP for the low ROI level ($QP_l$) is related to the frame QP level ($QP$) by the following equation:

Equation 1: Example Low QP to Frame QP relationship $$QP_l = \frac{11}{20}QP + 19$$

Next, the QP offset of the other ROI levels may be calculated according to the ROI level and block numbers. For example, if equal QP differentials are desired, the QP levels may be set as equidistant to each other, at 620. For a three level ROI schema, this may be provided by the following equation:

Equation 2: Equidistant QP levels $$QP_l - QP_m = QP_m - QP_h$$

Where $QP_m$ is the QP level for the medium ROI level, $QP_l$ is the QP level for the low ROI level, and $QP_h$ is the QP level for the high ROI level. Alternatively, the QP levels may be determined to be a constant offset between the high QP ROI level and the medium ROI level, at 630, in which case the QPs may be derived as the following equation:

Equation 3: Constant offset QP level $$QP_m - QP_h = C$$

Where C is a set constant. Lastly, QP levels for the frame and various ROI levels may be given by the following equation:

Equation 4: QP level in a frame $$B_l * QP_l + B_m * QP_m + B_h * QP_h = (B_l + B_m + B_h) * QP$$

Where $B_l$ is the number of blocks with the "low" ROI level designation, $B_m$ is the number of blocks with the "medium" ROI level designation, and $B_h$ is the number of blocks with the "high" ROI level designation. As $B_l$, $B_m$, and $B_h$ are known, $QP$ is known and $Q_l$ is known, Equation 4 may be solved, at 640, in conjunction with either Equation 2 or Equation 3 for $QP_m$ and $QP_h$, respectively. This results in the QP levels for each ROI level being properly set, thus concluding the process.

Figure 7A:
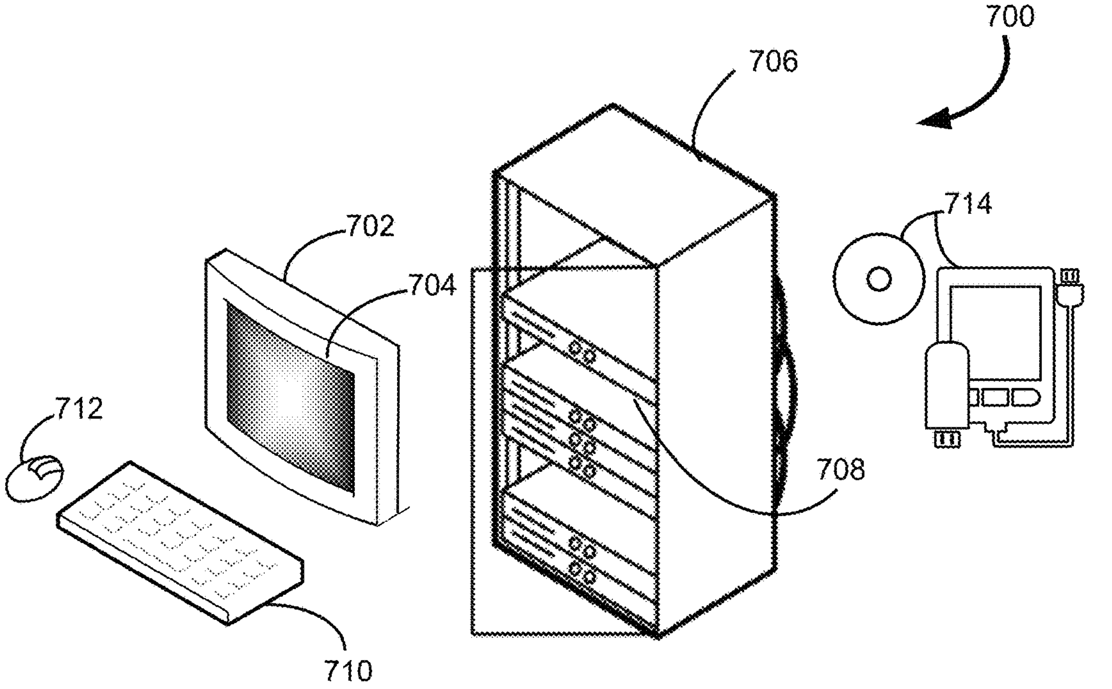
FIGS. 7A and 7B are illustrations of computer systems capable of implementing the ROI analysis, in accordance with some embodiments.
Figure 7B:
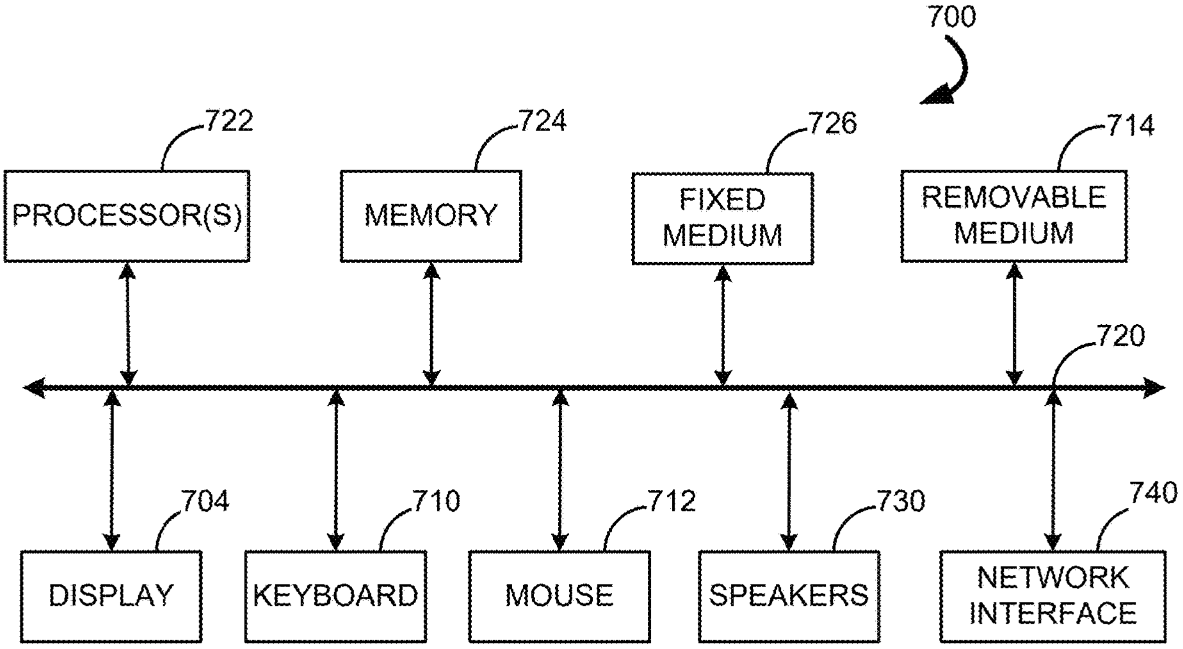

Now that the systems and methods for improved treatment of ROI have been provided, attention shall now be focused upon apparatuses capable of executing the above functions in real-time. To facilitate this discussion, FIGS. 7A and 7B illustrate a Computer System 700, which is suitable for implementing embodiments of the present invention. FIG. 7A shows one possible physical form of the Computer System 700. Of course, the Computer System 700 may have many physical forms ranging from a printed circuit board, an integrated circuit, and a small handheld device up to a huge supercomputer. Computer system 700 may include a Monitor 702, a Display 704, a Housing 706, server blades including one or more storage Drives 708, a Keyboard 710, and a Mouse 712. Medium 714 is a computer-readable medium used to transfer data to and from Computer System 700. FIG. 7B is an example of a block diagram for Computer System 700. Attached to System Bus 720 are a wide variety of subsystems. Processor(s) 722 (also referred to as central processing units, or CPUs) are coupled to storage devices, including Memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 726 may also be coupled bi-directionally to the Processor 722; it provides additional data storage capacity and may also include any of the computer-readable media described below. Fixed Medium 726 may be used to store programs, data, and the like and is typically a secondary storage medium (such as a hard disk) that is slower than primary storage. It will be appreciated that the information retained within Fixed Medium 726 may, in appropriate cases, be incorporated in standard fashion as virtual memory in Memory 724. Removable Medium 714 may take the form of any of the computer-readable media described below.

Processor 722 is also coupled to a variety of input/output devices, such as Display 704, Keyboard 710, Mouse 712 and Speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 722 optionally may be coupled to another computer or telecommunications network using Network Interface 740. With such a Network Interface 740, it is contemplated that the Processor 722 might receive information from the network, or might output information to the network in the course of performing the above-described ROI treatment methods. Furthermore, method embodiments of the present invention may execute solely upon Processor 722 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 700 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for improved ROI treatment of a coded video frame comprising:

- blocking a video frame into blocks;
- assigning a region of interest (ROI) level to each of the blocks, wherein the ROI levels include a high ROI level, a medium ROI level and a low ROI level, and further wherein the ROI level assignment includes:
  - determining variance for each block;
  - grouping blocks by similar variance;
  - detecting motion for each block;
  - assigning the ROI level responsive to the variance and presence of motion for the given block; and
- assigning a quantization parameter (QP) level to each block responsive to the ROI level for the given block, wherein a QP level for the low ROI level is determined based upon a frame QP level, wherein the frame QP level is known, wherein an offset for the QP level for the low ROI level and the frame QP level is inversely proportional to the frame QP level; and
- determining if the difference between a QP level for the high ROI level and a QP level for the medium ROI level is a constant, or if the difference between the QP level for the high ROI level and the QP level for the medium ROI level is equal to difference between the QP level for the medium ROI level and the QP level for the low ROI level.

2. The method of claim 1, further comprising assigning an ROI level to a block responsive to a bounding box being present.

3. The method of claim 2, wherein the bounding box is generated responsive to an algorithm identifying an object of interest.

4. The method of claim 1, further comprising assigning the high ROI level to a block containing motion detection and a higher variance, the high or the medium ROI level to a block containing a static background, and the low ROI level to all other blocks.

5. The method of claim 1, wherein the QP level for the high ROI level ($QP_h$) and the QP level for the medium ROI level ($QP_m$) are calculated based upon the OP level for the low ROI level ($QP_l$) being known, the determination if the difference between the $QP_h$ and the $QP_m$ is the constant, or if the difference between $QP_h$ and the $QP_m$ is equal to difference between $QP_m$ and the $QP_l$ given the equation:

$$B_l * QP_l + B_m * QP_m + B_h * QP_h = (B_l + B_m + B_h) * QP$$

Where $B_l$ is a number of blocks with the low ROI level, $B_m$ is a number of blocks with the medium ROI level, and $B_h$ is a number of blocks with the high ROI level, and $QP$ is the frame QP level.

6. The method of claim 1, further comprising smoothing the ROI level for a given block between consecutive frames.

7. A computerized system for improved ROI treatment of a coded video frame comprising:

- a blocking module embodied in a processor configured to block a video frame into blocks;
- a region of interest module embodied in the processor configured to assign a region of interest (ROI) level to each of the blocks, wherein the ROI levels include a high ROI level, a medium ROI level and a low ROI level, and further wherein the ROI level assignment includes:
  - determining variance for each block;
  - grouping blocks by similar variance;
  - detecting motion for each block;
  - assigning the ROI level responsive to the variance and presence of motion for the given block; and
- the region of interest module further configured to assign a quantization parameter (QP) level to each block responsive to the ROI level for the given block, wherein a QP level for the low ROI level is determined based upon a frame QP level, wherein the frame QP level is known, wherein an offset for the QP level for the low ROI level and the frame QP level is inversely proportional to the frame QP level; and
- determining if the difference between a QP level for the high ROI level and a QP level for the medium ROI level is a constant, or if the difference between the QP level for the high ROI level and the QP level for the medium ROI level is equal to difference between the QP level for the medium ROI level and the QP level for the low ROI level.

8. The system of claim 7, wherein the region of interest module embodied in the processor is further configured to assign an ROI level to a block responsive to a bounding box being present.

9. The system of claim 8, wherein the bounding box is generated responsive to an algorithm identifying an object of interest.

10. The system of claim 7, wherein the region of interest module embodied in the processor is further configured to assign the high ROI level to a block containing motion detection and a higher variance, the high or the medium ROI level to a block containing a static background, and the low ROI level to all other blocks.

11. The system of claim 7, wherein the QP level for the high ROI level ($QP_h$) and the QP level for the medium ROI level ($QP_m$) are calculated based upon the OP level for the low ROI level ($QP_l$) being known, the determination if the difference between the $QP_h$ and the $QP_m$ is the constant, or if the difference between $QP_h$ and the $QP_m$ is equal to difference between $QP_m$ and the $QP_l$ given the equation:

$$B_l * QP_l + B_m * QP_m + B_h * QP_h = (B_l + B_m + B_h) * QP$$

Where $B_l$ is a number of blocks with the low ROI level, $B_m$ is a number of blocks with the medium ROI level, and $B_h$ is a number of blocks with the high ROI level, and $QP$ is the frame QP level.

12. The system of claim 7, wherein the region of interest module embodied in the processor is further configured to smooth the ROI level for a given block between consecutive frames.

* * * * *